United States Patent [19]

Schwartzman

[11] Patent Number: 4,815,207

[45] Date of Patent: Mar. 28, 1989

[54] CLAMPING TOOL AND STRIPPING METHOD FOR COAXIAL CABLE

[75] Inventor: Benjamin Schwartzman, Hagerstown, Md.

[73] Assignee: AMP Incorporated, Harrisburg, Pa.

[21] Appl. No.: 43,004

[22] Filed: Apr. 27, 1987

[51] Int. Cl.$^4$ ............... H01B 13/20; B26B 27/00; H02G 1/12

[52] U.S. Cl. ............... 29/828; 30/90.1; 81/9.51; 269/275; 269/287

[58] Field of Search ............ 29/825, 828, 33 F; 81/9.51, 9.4; 30/90.1; 269/22, 229, 274, 275, 287, 903

[56] References Cited

U.S. PATENT DOCUMENTS

| | | | |
|---|---|---|---|
| 3,346,949 | 10/1967 | Apa et al. | |
| 3,486,216 | 12/1969 | Cimolino | 29/828 |
| 4,059,892 | 11/1977 | Siden | 30/90.1 |
| 4,099,428 | 7/1978 | Senior et al. | 81/9.51 |
| 4,538,487 | 9/1985 | Hatfield et al. | |
| 4,559,704 | 12/1985 | Michael, III | |
| 4,628,599 | 12/1986 | Bermier, Jr. et al. | |

Primary Examiner—Carl J. Arbes
Attorney, Agent, or Firm—William B. Noll

[57] ABSTRACT

A clamp to axially hold small coaxial cable (10) of a type having a soft dielectric core (16) includes a rigid element (30) having a groove (32) to receive the cable laid therein and an elastomeric element (4) having a projection (42) shaped to fit partially around the cable and along the length thereof and be compressed to preclude movement of said cable axially while minimizing cable core deformation to allow the cable to be worked upon relative to stripping and termination. A method using clamps fore and aft of stripping blades (50-52) clamped on the cable embraces holding the cable and the blades stationary while moving one clamp (30M-42M) axially to remove the cable sheath and foil.

13 Claims, 4 Drawing Sheets

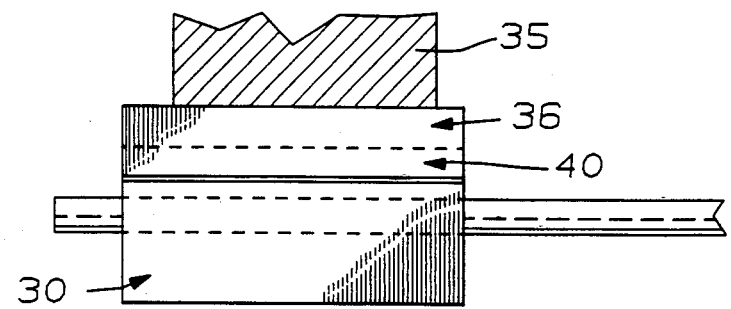
Fig. 3B
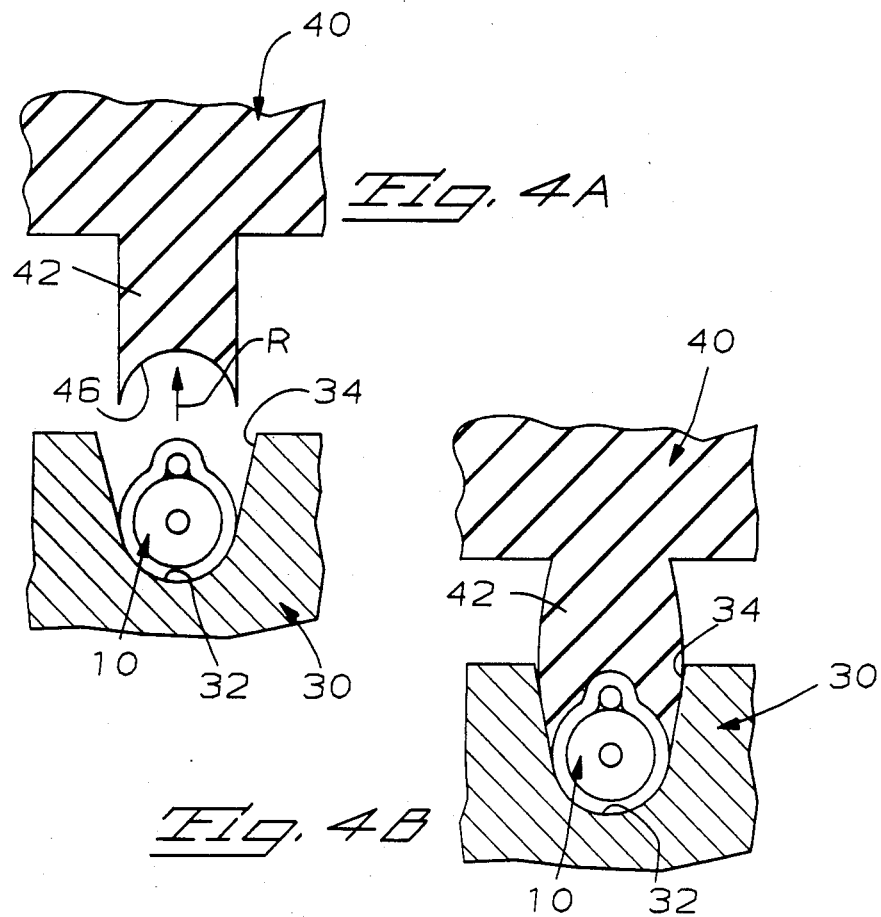
Fig. 4A
Fig. 4B

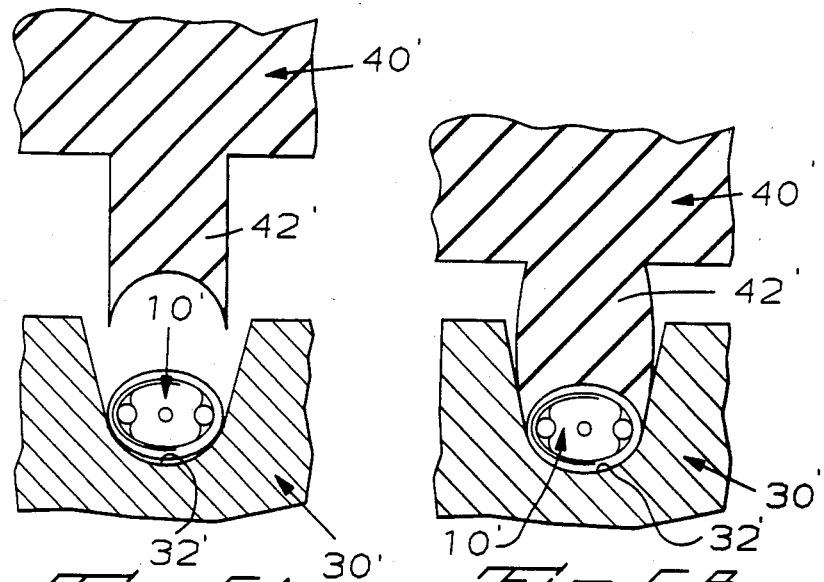
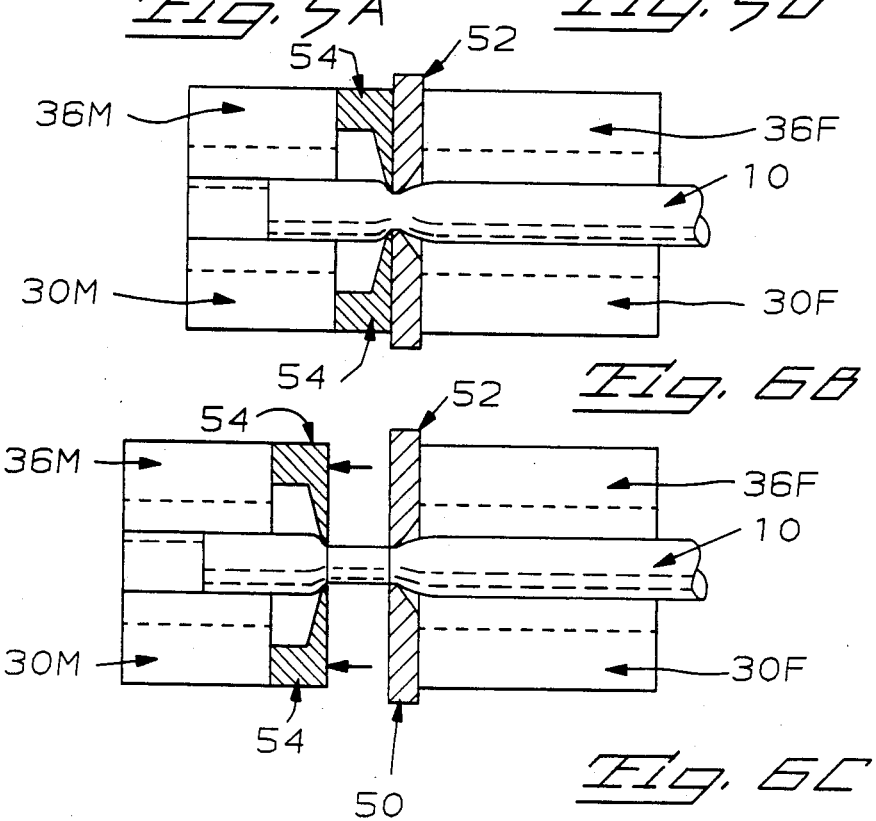

CLAMPING TOOL AND STRIPPING METHOD FOR COAXIAL CABLE

The present invention relates to a tool to clamp cable to allow ancillary cable handling operations such as stripping, termination, and the like and to a method of stripping small coaxial cables having soft dielectric cores which are easily damaged.

BACKGROUND OF THE INVENTION

A variety of coaxial cables have come into use which are quite small dimensionally, being on the order of less than a tenth of an inch in diameter and having a fragile construction. These cables may have conductors on the order of one hundredth of an inch in diameter and employ dielectric cores which are made light and spongy in order to have dielectric constants and velocities of propagation approaching that of air. Typically, the cable cores are surrounded by thin films of protective plastic materials such as Teflon or Mylar wrapped thereabout and other materials such as vinyl extruded thereover. Reference may be had to U.S. patent application Ser. No. 897,577 filed Aug. 18, 1986, now abandoned in the name of Norman Ralph Birch et al. for a teaching relating to such cable and the termination thereof.

While cable of this type is widely used, handling of such cable for the purposes of termination and stripping has proven difficult. Most typically, the prior art approach to such operations has involved the use of razor blades and a great deal of care. For example, stripping is typically done under magnification with a variety of jigs and other means used to minimize damage to the cable. Also typically, the operation of stripping and termination has been labor intensive, utilizing skilled personnel. With the ever increasing use of such cable, the problem has taken on an economic significance. Perhaps of even more importance and in addition to the cost of handling cable for stripping and termination, is the fact that the cable itself is damaged in handling. This is in part because no two operators are equally dexterous and the very fine dimensions of the cable, conductors, dielectric and sheath, make the job difficult.

In U.S. patent application Ser. No. 944,779 filed Dec. 22, 1986, now U.S. Pat. No. 4,766,669 issued Aug. 30, 1988 in the name of B. Schwartzman, there is taught a novel stripping tool for cable of the type under consideration. While this stripping tool is highly useful and of advantage, the need for clamping or holding the cable axially to allow its stripping has been made manifest, the tendency being either to squeeze the cable too hard, crushing its core beyond recovery or allowing the cable to slip, causing damage to the cable constituents.

The background of the invention is thus one of clamping or holding delicate coaxial cable and difficulty in stripping such cable.

Accordingly, it is an object of the present invention to provide a tool to clamp delicate coaxial cable against axial movement so as to permit operation on such cable for the purposes of stripping, termination, insertion, or the like.

It is a further object of the invention to provide a tool for use with coaxial cable of a type having multiple fine conductors in conjunction with a soft, spongy dielectric core wrapped in a film of protective sheath material which permits such cable to be held without damage to the cable constituents while the cable is being worked upon.

It is yet a further object to provide an improved clamping tool for use with small, fragile cables.

Finally, it is an object to provide an improved method of stripping delicate coaxial cable.

SUMMARY OF THE INVENTION

The present invention features a coaxial cable tool having a relatively fixed element and a movable element, driven together to clamp a cable with one of the elements being of relatively rigid material and the other element being elastomeric in nature. The fixed element in an illustrative embodiment is made to contain a groove allowing the cable to be laid therein in an easy fit, the groove being relatively long compared to the cable diameter and a further element, an elastomeric element, having a projection to push and confine the cable in such groove. The elastomeric element, also of a length relatively long compared to the diameter of the cable, is made to deform as well as to provide a broad area of contact with the cable thereby developing a substantial frictional holding against axial displacement of the cable with a minimum deformation thereof to thus effect the clamping action. The invention tool is taught in a construction capable of handling many cables at a time, with such cables being spaced apart individually or in groups for subsequent manipulation and handling. The tool in a preferred embodiment is featured with a rigid base plate having the aforementioned grooves therein and a movable upper plate also of rigid material having therein a cavity containing the elastomeric element having projections, one for each groove, in the base plate and arranged to be driven by the movable plate to effect clamping of cables laid in the grooves.

The method of the invention embraces clamping the cable with the tool construction of the invention, on either side of stripping blades with such blades and the cable fixed against movement, then displacing half of the clamping tool axially to strip the cable.

BRIEF DESCRIPTION OF THE DRAWINGS

The features and advantages of the invention will be further appreciated by way of example in relation to the detailed description which follows as applied to the accompanying drawings.

FIG. 3B shows a side view of the tool construction of FIG. 3A;

FIG. 4A shows an end view of the tool of the invention much enlarged from actual size and in an open condition preparatory to closure for clamping.

FIG. 4B is an end view of the elements of FIG. 4A with the tool shown in the closed and clamping position.

FIG. 5A is an end view in cross section of the tool in an open condition preparatory to clamping a cable of the alternative construction.

FIG. 5B is an end view of the elements of FIG. 5A shown in a closed and clamping position.

FIG. 6B is a side view of the elements of FIG. 6A as closed upon a cable preparatory to stripping.

FIG. 6C is a view of the elements of FIG. 6B displaced to effect stripping.

DETAILED DESCRIPTION OF THE INVENTION

Figure 1:
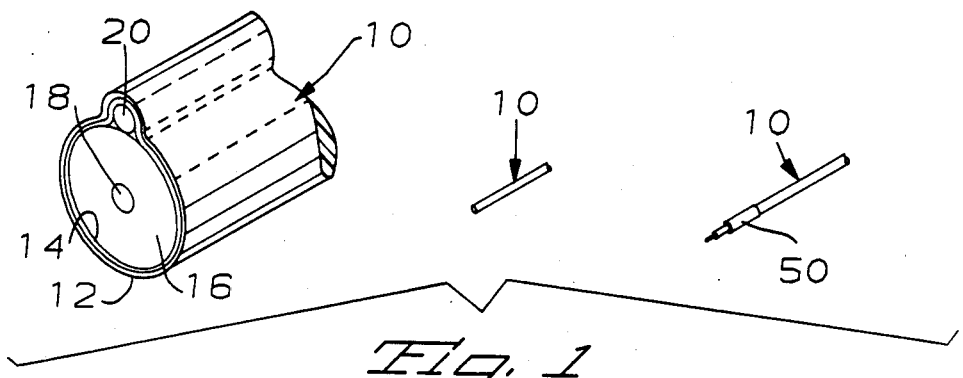
FIG. 1 is a perspective showing to the left a high speed signal transmission cable much enlarged relative to, on the immediate right, a cable of roughly of actual dimension, and further to the right, a similar cable terminated by a coaxial connector of more or less actual dimension.
Figure 2:
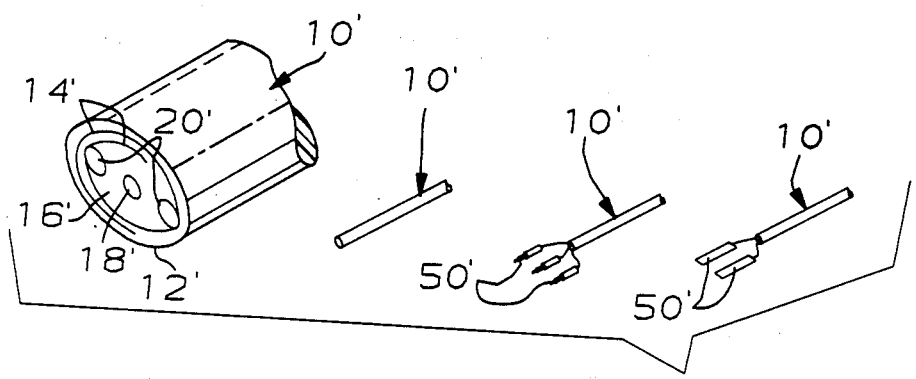
FIG. 2 is a perspective showing to the left a high speed signal transmission cable of an alternative construction and also much enlarged from actual scale, and on the immediate right thereof a cable of roughly actual size followed by a cable of roughly actual size terminated in one fashion and further to the right, such cable terminated in an alternative fashion.

Referring now more particularly to the drawings and to an illustration of the invention tool in a preferred embodiment thereof, reference is made to FIGS. 1 and 2, which each contain perspectives of coaxial cables widely used to transmit data signals. In FIG. 1, the much enlarged view to the left reveals a cable 10 having an outer protective sheath 12 surrounding a thin film-like conductive foil 14, which in turn surrounds a dielectric core 16 and therewithin a central signal conductor 18 and a grounding or drain conductor 20. The outer plastic sheath 12 may be provided in a variety of constructions including that of a Teflon film wrapped around the conductive foil 14, the typical Teflon film being on the order of between 0.002 and 0.004 inches in thickness. The Teflon film which forms the sheath may be either spirally wound about the cable or given a "cigarette wrap" which contains an overlapping fold extending along the axis longitudinally of the cable. Alternatively, the sheath 12 may be comprised of polyvinyl chloride or other similar materials extruded over the surface of the foil 14, in which event the thickness may be as much as 0.010 to 0.012 inches.

The foil 14 is typically comprised of a polyester film such as that identified by the trademark Mylar which is coated or covered with a conductive layer such as an aluminum foil, the combined thickness which is typically on the order of 0.0015 to 0.002 inches. This foil may be spirally wound or provided in a cigarette wrap over the remaining constituents including the conductors 18 and 20 and the dielectric core 16. The conductors 18 and 20 are typically comprised of 30 AWG wire (0.010 inches diameter) formed by tin plated copper wires with respect to the so-called 50 OHM cable, or slightly smaller wires such as 32 AWG (0.008 inches diameter) for the so-called 75 and 90 OHM cable. The diameter of the dielectric core 16 would range from between 0.027 inches to 0.039 inches for 50 OHM cable corresponding to the smaller diameter cable. Providing perspective in addition to the view to the right of the enlarged cable as shown in FIG. 1, the overall cable diameter is smaller than the lead in a common wooden pencil and the wires or conductors are only several times as large as that of the human hair.

The dielectric core 16 is typically formed of a foamed Teflon material or, alternatively, a highly expanded irradiated polyolefin. Generally, speaking, the more air that can be entrapped in the core of the dielectric material, the closer core dielectric constant and propagation velocity parameters become to that of air, the ideal medium for high speed signal transmission. Foamed material having dielectric constants only 30 percent greater than that of air and velocities of propagation only 15 to 20 percent less than that of air are now being employed. The need for providing cores having these parameters has indeed driven cable constructions to the point that the cores are barely capable of supporting the remainder of the cable elements. These cores are spongy, easily displaced, and physically fragile and delicate. By being confined in the foil and outer sheath, the cores are made to maintain their shape throughout, although rigid rules are provided in terms of bend angles or external loads that can be tolerated.

Still in all, the cables must be handled, stripped at the ends for termination, and terminated. FIG. 1 shows one type of termination with coaxial connector 50 terminated to cable 10 which indeed is a coaxial termination of the type previously referred to in U.S. patent application Ser. No. 897,577.

FIG. 2 shows an alternative construction for a coaxial cable of the "trilead" variety, the cable having three conductors. As can be discerned from FIG. 2, the cable 10' is shown much enlarged to the left which includes an outer sheath 12' surrounding a conductive foil 14', which in turn surrounds a dielectric core 16', a central conductor 18', and two grounding or drain conductors 20'. The overall construction of the cable is similar to that heretofore described, with a typical cable having a maximum width of on the order of 0.060 inches, a minimum width or height dimension on the order of 0.045 inches. The cable central signal conductor 18' is on the order of 0.008 inches in diameter with the grounding conductors 20' being on the order of 0.012 inches in diameter.

FIG. 2 shows to the right of the enlarged view of the cable, cable 10' which is more or less of actual size. To the right of that view, cable 10' is terminated with three terminals 50' which are pin or post contacts crimped or soldered to the appropriate conductors as shown. To the right of that view in FIG. 2 is an alternative termination of the cable 10', wherein the two ground conductors are terminated in the same post or pin contact 50', with the signal conductor being terminated in a parallel contact 50'. Both cables as terminated are used in conjunction with connector housings not shown.

The difference in cable constructions is tied to a different perception by users of the needs for such cable, more tied to the signal transmission techniques and the impedance and forward and backward crosstalk characteristics desired. In both instances, the relatively soft and spongy air-like cores 16 and 16' contribute heavily to the problem of handling and manipulation of the cable for the necessary stripping and termination of the cable, as well as insertion of terminated contacts into connector housings. The fact is that the cables have very little strength or provide little support for radially applied forces, attempts to clamp or grip the cable by the usual means proving difficult.

Figure 3A:
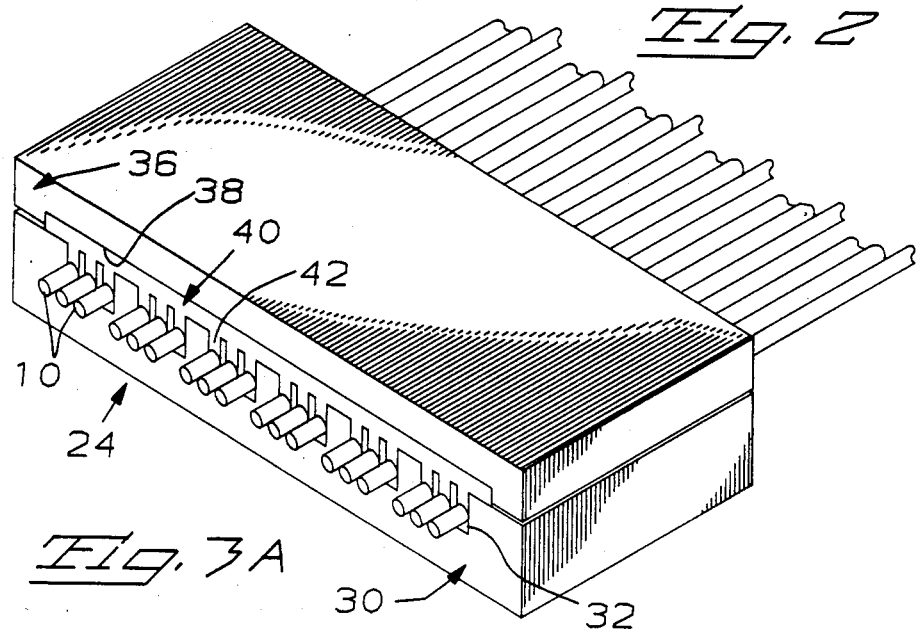
FIG. 3A shows in perspective the tool of the invention in a closed condition clamping multiple coaxial cables.

FIG. 3A shows a tool 24 in illustrative form, incorporating the details of the present invention. With respect to the tool 24, it is seen to contain positions to clamp some eighteen cables simultaneously with the cables 10 shown having their ends projecting outwardly. The tool includes a grouping of the eighteen cables into six sets of three each, allowing for the cables to be handled in multiples or batches.

The tool 24 includes a base plate 30 containing a series of grooves 32 formed in one surface thereof. As can be seen from FIG. 3A and more particularly in FIG. 3B, the base plate 30 containing the grooves 32 is of a length many times the diameter of the grooves and thus of the diameter of cable 10. The base plate 30 is thick enough, when taken in conjunction with the material of which it is made, to be rigid and non-yielding across its length and width. The plate may be made of steel, of either mild or tool quality, depending upon acceptable cost parameters, with the grooves suitably machined therein. A top plate 36 of similar material is arranged as shown in FIG. 3B to be driven downwardly against the relatively fixed bottom plate 30 to affect a clamping action. The top plate 36 includes an interior groove 38 into which is fitted an elastomeric insert 40 containing projections 42 which are aligned with the grooves 32 and shaped to clamp the cable. The element 40 is typically molded or cast of a flexible or elastomeric plastic material such as rubber, urethane or a silicon material having a durometer on the order of 65 to 85. Groove dimensions relate to cable dimensions with the bottom of the groove having a similar radius to the cable radius. Cables of both twin and trilead construction having roughly similar width dimensions (0.050-0.060) can use a commonly dimensioned groove 32.

In practice, the lower plate 30 may be fixed as to the base of a tool having a driving mechanism having the upper plate 36 fixed to a movable ram 35 as is shown in FIG. 3B. The elastomeric element 40 is affixed by suitable means to the upper plate 36, the element 40 being bonded by an adhesive in the embodiment shown in FIGS. 3A and 3B. In use, the cables 10 are laid into the grooves 32 with the end portions projecting outwardly sufficient to allow whatever operations are to be done on the cable ends, and with the various signal, ground conductors being commonly oriented as between the various multiple cables being clamped. Thereafter, the upper plate 36 is brought down to a point of closure of the end portions thereof so as to compress the projections 42 of the elastomeric element 40.

Alternatively, the elements 30 and 36 may be provided in a jig which is portable and removable from the closure tool, having means not shown to latch the two elements together so that the tool ensemble can be picked up, carried, and handled relative to stripping and termination or connector loading operations. Simple screws or fast take up can serve this purpose.

In an actual example of the tool utilized for clamping, the lower element was roughly 3.15 inches in width, 0.450 inches in thickness, with the groove to the left as shown in FIG. 3A being 0.470 inches from the left edge thereof.

The second groove from the left edge was positioned at a center line of 0.568 inches and the third groove was positioned along a center line of 0.666 inches. The next or fourth groove from the left was positioned along a center line of 0.862 inches, with appropriate dimensioning for the remainder of the grooves and groups of grooves. In the tool just referred to, the length thereof was on the order of 1.00 inches.

The lower element 30 and the upper element 36 were made of mild steel material. The elastomeric insert 40 was made of a Devcon Flexane 85 material, having appropriate dimensions to the rigid elements just described and as will be detailed hereinafter. This material is commercially available from the DuPont Company.

Referring now to the invention in greater detail, reference is made to FIGS. 4A and 4B, which represent one of the eighteen positions of FIG. 3A. In FIG. 4A, a cable 10 is shown positioned within the groove 32 of base element 30. As can be seen, the cable is simply laid within the groove which is dimensioned to have a lower rounded surface shaped to conform with the general curvature of the cable, with a pair of sidewalls 34 which are tapered to allow an easy entry of the cable when laid or positioned within the groove 32. In an actual embodiment, the taper of sidewalls 34 is on the order of 15 degrees relative to a perpendicular plane extending through the middle of the groove along the length thereof. The upper elastomeric element 40, including a projection 42 is made to include an interior surface 46 rounded to generally conform with the exterior dimensions of the cable. The leading edges of such projection which are shown to be quite sharp, are in fact made as sharp as is practical considering molding to provide a body which is not easily broken or otherwise caused to fail in use. The interior surface of the projection on 42 which is shown as 46 had in an actual embodiment, a radius R equal to 0.037 inches, such radius being taken from a point central to the projection 42 and removed 0.100 inches from the root of the projection. The projection 42 was made on the order of 0.066 inches in width.

Upon application of a force to the upper plate 36, the elastomeric material 40 including the projection 42, is driven downwardly into engagement with the cable 10 and the groove 32 in lower plate 30. This is shown in FIG. 4B. As can be seen, the projection 42 deforms around the cable, effecting an intimate surface-to-surface contact therewith along the length of the groove and projection 42. In the closed condition shown in FIG. 4B, the tool will grip the cable firmly against axial displacement, allowing stripping of the outer sheath and foil cleanly and evenly as disclosed in U.S. patent application Ser. No. 944,779, with minimum damage to the cable constituents. In use, a desirable and suitable clamping and holding action has been found to occur regardless of the orientation of the cable 10 with respect to the signal and grounding wires, the projection 42 tending to conform with the cable outer surface in all cases.

Referring now to FIG. 5A, the cable 10' is shown within a groove 32' of an appropriate tool preparatory to closure of the projection 42' for clamping action. This clamping action is shown in FIG. 5B with the projection 42' having a surface 46' conforming to the cable surface and driving it against the groove surfaces as heretofore mentioned with respect to FIGS. 4A and 4B.

While the tool of the invention has been disclosed with respect to coaxial cables of a type utilized to transmit the data signals in the so-called RF range, it is contemplated that cables having similar constructions wherein there is a fragile core involved could be served as well. It is also contemplated that the invention may be fabricated in hand tools for handling one cable at a time or in a variety of tooling jigs and fixtures handling multiple cables where one or both ends of the cable can be accommodated in the tool or jig.

Figure 6A:
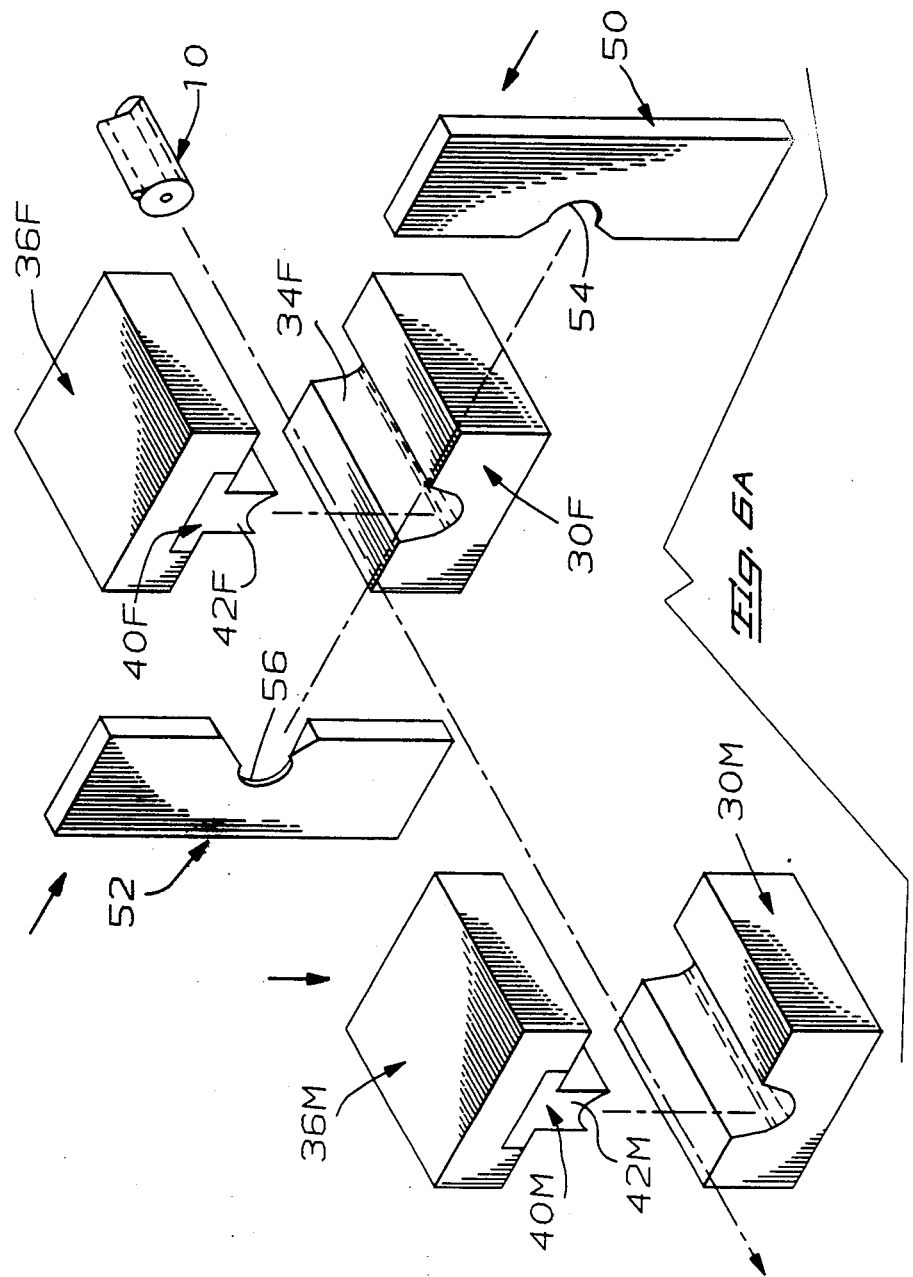
FIG. 6A is an exploded view in perspective of the clamp assembly of the invention relative to stripping of a cable.

Referring now to FIGS. 6A-6C, the invention method of stripping coaxial cable will be detailed. FIG. 6A shows in an exploded view a cable 10 preparatory to being positioned within a first clamp 30F-42F comprised of the elements heretofore described relative to the clamping aspect of the invention. Also shown in FIG. 6A is a second clamp 30M-42M which is brought to close upon cable 10 as shown in FIG. 6B. Between the clamp structures, a pair of cable stripping blades 50-52 are provided containing edge surfaces 54 and 56 which are driven by means not shown to close and function in the manner detailed in the U.S. patent application Ser. No. 944,779 heretofore mentioned. Differing from such teaching the present invention method uses two clamps with the clamp 30F-42F and the cable 10 relatively fixed or stationary. The clamps 30M-42M are moved axially as indicated in FIG. 6C to pull the cable outer sheath 12 and foil wrap 14 off the core 16 of the cable.

In operation, the cable 10 is positioned within the first clamp groove 34F with an end extending outwardly a sufficient and desired length for subsequent operations as described in U.S. patent application Ser. No. 944,779. The clamps 30F-42F and 30M-42M are then closed on the cable with the blades 50-52 also closed on the cable. The clamp 30M-42M is then displaced to the left as in FIG. 6C while blades 50-52 remain stationary along with clamp 30F-42F and further axially to remove the cable outer sheath. This technique has been found to cleanly remove the outer sheath and conductive foil without damage to the cable core or the signal and ground conductors, the broad area of contact with the cable effected by use of the elastomeric medium of 42F and 42M gripping the cable firmly without crushing or tearing the fragile components. In an actual tool, thousands of stripping operations were done without cable damage contrasting to prior efforts where damage was experienced in one out of two attempts to strip such cable.

Also, gripper blades 54 can be associated with clamp 30M-42M for gripping the outer jacket of cable 10 in order to more effectively strip the outer jacket and foil wrap.

The tool and method of the invention were found to work with cable having parallel conductors or with cable having the ground conductor spirally wound about the cable core.

The nature and utility of the invention apparatus and method having now been disclosed in preferred illustrated embodiments, its scope is now defined in the appended claims.

What is claimed is:

1. In a tool for clamping a coaxial cable of a type wherein there is a soft porous dielectric core surrounding a central conductor having at least one ground conductor adjacent the outer surface of said core, in turn surrounded along the said core by a sheath of a material relatively denser than said core, the combination comprising a first element of relatively rigid material having a groove therein of a cross-sectional geometry approximating in the outer surface thereof that of the said cable, a second element of elastomeric material including a projection of a cross-sectional geometry adapted to fit within said groove and to bear against a cable placed in said groove, a third element of rigid material positioned adjacent said second element to drive said projection into said groove to clamp said cable whereby to effect a substantial surface engagement between the said first and second elements to hold said cable against axial displacement relative to said groove.

2. The tool of claim 1 wherein the said groove and projection of said first and second elements have a length sufficiently longer than the diameter of said cable whereby to effect a broad area of contact with the outer surface of said cable.

3. The tool of claim 2 wherein the length of said groove and projection is at least twice the diameter of said cable.

4. The tool of claim 1 wherein the leading surface of the said projection is concave in shape, with said shape having a geometry to generally conform with the engaged surface of said cable.

5. The tool of claim 1 wherein the said groove includes sidewalls which taper outwardly away from a radiused bottom surface to facilitate ease of cable insertion and removal therefrom.

6. The tool of claim 5 wherein the said taper is on the order of 15 degrees measured between the plane of the surface of the taper and a plane bisecting the said groove along the length thereof.

7. The tool of claim 1 wherein the said elastomeric material of the projection is of a durometer on the order of 60 to 85 as measured on the Shove scale.

8. In a tool for clamping and holding coaxial cables of a type wherein there is a soft and porous dielectric core surrounding a central signal conductor, in turn surrounded by a harder and denser sheath material, the combination comprising a first element containing a series of grooves having a cross-sectional geometry generally similar to that of the said cables, a second element including projections adapted to be fitted within said grooves, said second element and projections being comprised of an elastomeric material and including leading surfaces concave in geometry to generally conform with the exterior shape of the said cables and means to drive said second element to force said projections into said grooves clamping said cables, with the said projections deforming to minimize deformation of said cables while effecting the clamping and holding thereof relative to said grooves.

9. The tool of claim 8 wherein the said grooves are arranged in groups of at least two grooves with the spacing between the grooves in a given grouping being different from the spacing between a given groove in one group and the adjacent groove in an adjacent group.

10. In a tool for clamping a cable of a type having a soft and porous core surrounding a rigid inner element, with said core in turn being surrounded by a sheath of material more dense than said core, the improvement comprising a base element of rigid material having a groove therein of a cross-sectional configuration similar to said cable, a second element of a substantially flexible material having a projection including a concave surface adapted to engage the said cable with means to drive the said second element so that said surface engages said cable and to force said second element to clampingly hold said cable against axial movement relative to said groove whereby to permit secondary operations to be preformed on said cable.

11. A method for stripping cable of the type having a soft porous core surrounding a center conductor in turn surrounded by a sheath of material more dense than said core and including at least one ground conductor between said sheath and said core including the steps of clamping said cable in first and second segments axially spaced apart, said steps of clamping include the application of an elastomeric medium against the said sheath, where said medium is caused to yield to preserve the dimensional integrity of said sheath, forcing stripping blades against and through said cable sheath in a third segment axially between said first and second segments and then axially displacing the cable sheath by axially moving the first said segment as clamped relative to the said cable and the said blades and said second segment as clamped whereby to remove a segment of said sheath from said cable.

12. In a method of stripping fragile coaxial cable of a type having a central signal conductor surrounded by a soft porous dielectric core in turn surrounded by a foil and an outer protective sheath of relatively tough material with a ground conductor disposed adjacent said foil, the method including the steps of:
   (a) positioning two cable clamps each including an elastomeric element driven to entrap and bear against a cable segment positioned in a groove of a material more rigid than said elastomeric element, said element bearing against said cable along a length thereof greater than the cable diameter,
   (b) driving a stripping means against said cable and through at least said sheath between two clamped segments thereof,
   (c) holding one cable clamp, said cable and said stripping means fast, and
   (d) displacing the other cable clamp axially to pull off said sheath and foil from said core with minimum damage to the remaining components of said cable.

13. In a method of stripping coaxial cable, the steps comprising clamping the cable in a first clamp having one element grooved to receive the cable in an easy fit and a second element of an elastomeric material driven against the cable as fitted in a groove to grip the cable, holding the cable fast via said clamp with an end of cable protruding and then applying stripping blades against said cable adjacent said first clamp, clamping said cable outboard of said stripping blades with a second clamp being one element grooved to receive the said cable protruding end and a second element of an elastomeric material, and displacing said second clamp and said stripping blades axially to strip said cable.

* * * * *